(12) United States Patent
Choi et al.

(10) Patent No.: US 12,449,332 B2
(45) Date of Patent: Oct. 21, 2025

(54) APPARATUS FOR INSPECTING SHOES AND METHOD FOR INSPECTING SHOES USING THE SAME

(71) Applicant: ELECTRONICS AND TELECOMMUNICATIONS RESEARCH INSTITUTE, Daejeon (KR)

(72) Inventors: Da Hye Choi, Daejeon (KR); Kyung Hyun Park, Daejeon (KR); Il Min Lee, Daejeon (KR); Mugeon Kim, Daejeon (KR); Eui Su Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 534 days.

(21) Appl. No.: 17/938,239

(22) Filed: Oct. 5, 2022

(65) Prior Publication Data
US 2023/0280241 A1   Sep. 7, 2023

(30) Foreign Application Priority Data
Mar. 3, 2022   (KR) .................. 10-2022-0027493

(51) Int. Cl.
*G01N 1/14*   (2006.01)
*G01N 1/02*   (2006.01)
*G01N 1/10*   (2006.01)

(52) U.S. Cl.
CPC ......... *G01N 1/14* (2013.01); *G01N 2001/024* (2013.01); *G01N 2001/1031* (2013.01)

(58) Field of Classification Search
None
See application file for complete search history.

(56) References Cited

U.S. PATENT DOCUMENTS

| | | | |
|---|---|---|---|
| 4,987,767 A | 1/1991 | Corrigan | |
| 8,001,702 B1 * | 8/2011 | Wasserman | A43B 7/082 |
| | | | 36/8.1 |

(Continued)

FOREIGN PATENT DOCUMENTS

| | | |
|---|---|---|
| KR | 1994-0009049 B1 | 9/1994 |
| KR | 10-2006-0070548 A | 6/2006 |

(Continued)

OTHER PUBLICATIONS

David M. Sheen et al., "Efficient image reconstruction method for a millimeter-wave shoe scanner," Passive and Active Millimeter-Wave Imaging XXIII, 2020.

*Primary Examiner* — Suman K Nath

(57) ABSTRACT

The inventive concept relates to an apparatus for inspecting shoes and a method for inspecting shoes, and the apparatus includes an inspection unit configured to accommodate an inspection subject, a transmission unit configured to emit electromagnetic waves toward the inspection subject accommodated in the inspection unit, a reception unit configured to receive the electromagnetic wave reflected from the inspection subject, an injection unit configured to inject a fluid toward a bottom part of the inspection subject accommodated in the inspection unit, a suction unit configured to suction a material separated from the bottom part of the inspection subject together with the fluid, and an analysis unit configured to analyze a component of the material introduced into the suction unit and the electromagnetic wave received by the reception unit.

19 Claims, 12 Drawing Sheets

(56) References Cited

U.S. PATENT DOCUMENTS

| | | |
|---|---|---|
| 10,948,586 B2 | 3/2021 | Manneschi |
| 2007/0056396 A1 | 3/2007 | Mawer |
| 2007/0220953 A1 | 9/2007 | Perry et al. |
| 2013/0125620 A1* | 5/2013 | Ovadia ................ G01N 1/2273 73/23.39 |
| 2014/0076068 A1 | 3/2014 | Hillis et al. |
| 2021/0019640 A1 | 1/2021 | Kim |
| 2021/0165752 A1 | 6/2021 | Kang |

FOREIGN PATENT DOCUMENTS

| | | |
|---|---|---|
| KR | 10-2013-0078201 A | 7/2013 |
| KR | 10-2018-0005733 A | 1/2018 |

* cited by examiner

APPARATUS FOR INSPECTING SHOES AND METHOD FOR INSPECTING SHOES USING THE SAME

CROSS-REFERENCE TO RELATED APPLICATIONS

This U.S. non-provisional patent application claims priority under 35 U.S.C. § 119 of Korean Patent Application No. 10-2022-0027493, filed on Mar. 3, 2022, the entire contents of which are hereby incorporated by reference.

BACKGROUND

The present disclosure relates to an apparatus for inspecting shoes and a method for inspecting shoes, and more particularly, to an apparatus for inspecting shoes and a method for inspecting shoes that simultaneously perform moisture removal and explosive trace inspection based on millimeter wave/terahertz wave.

In addition to the increasing imports of contraband, such as drugs or anesthetics, the illegal use of explosives has increased rapidly. While it is impossible to detect or prevent all ongoing explosive and drug smuggling, detection of explosives and contraband is possible in certain areas where high visibility and/or vulnerabilities exist, such as in airports or in airplanes. An individual may load narcotics or explosives on an airplane, and furthermore, there may be many ways to conceal narcotics or explosives in various places when boarding the plane. For example, by loading unauthorized substances inside the baggage that is loaded in the baggage compartment of an airplane, or by concealing unauthorized or dangerous substances on the body of an individual, the dangerous substances may be carried on board an airplane by an individual.

Methods for detecting explosives and substances such as narcotics or anesthetics have been studied for many years, and various technologies have been developed from explosive/sniffing dogs to very sophisticated vapor detection devices. Basically, the detection of such hazardous substances is carried out by one of two methods, that is, a non-vapor detection method and a vapor detection method. Non-vapor detection methods include X-ray detection, gamma-ray detection, neutron activation detection, and nuclear magnetic resonance detection methods. These detection methods may be applied to detect light hazardous substances that are hidden, carried, or bound to inanimate objects such as luggage carried in airplanes. Vapor detection methods include electron capture detection, gas chromatography analysis detection, mass spectrometry detection, plasma chromatography analysis detection, bio-sensor detection, and laser emission acoustic detection methods. These detection methods are applicable to the detection of substances hidden or bound by household items, such as residues left on individuals who have been treated with various substances and substances that may be carried by individuals. All of the methods described above, including explosive/drug sniffing dogs, are currently in use.

In recent years, as the threat of terrorism is increasing in countries around the world, reinforcement of security inspection is required. Millimeter wave/terahertz wave has the property of penetrating various materials that visible light cannot pass through, such as paper, plastic, and clothes, and is a non-ionizing electromagnetic wave, and accordingly, is considered suitable for use in personal security inspection. Currently, a full-body inspection machine using millimeter wave is used at airports, and various systems are being tested in addition to the currently used inspection machine.

SUMMARY

The present disclosure provides an apparatus for inspecting shoes and a method for inspecting shoes using the same in which inspection efficiency and accuracy of hidden substances or dangerous substances are improved, and convenience of customers undergoing inspection is improved.

An embodiment of the inventive concept provides a shoe inspection apparatus for detecting hidden or dangerous substances, the shoe inspection apparatus including: an inspection unit configured to accommodate an inspection subject; a transmission unit configured to emit electromagnetic waves toward the inspection subject accommodated in the inspection unit; a reception unit configured to receive the electromagnetic wave reflected from the inspection subject; an injection unit configured to inject a fluid toward a bottom part of the inspection subject accommodated in the inspection unit; a suction unit configured to suction a material separated from the bottom part of the inspection subject together with the fluid; and an analysis unit configured to analyze a component of the material introduced into the suction unit and the electromagnetic wave received by the reception unit.

In an embodiment of the inventive concept, a method for inspecting shoes for detecting hidden substances or hazardous substances includes: placing an inspection subject on an upper surface of an inspection unit; spraying a fluid toward the inspection subject on the inspection unit; suctioning a material separated from the inspection subject together with the fluid; scanning the inspection subject on the inspection unit using electromagnetic waves; and analyzing the suctioned material.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
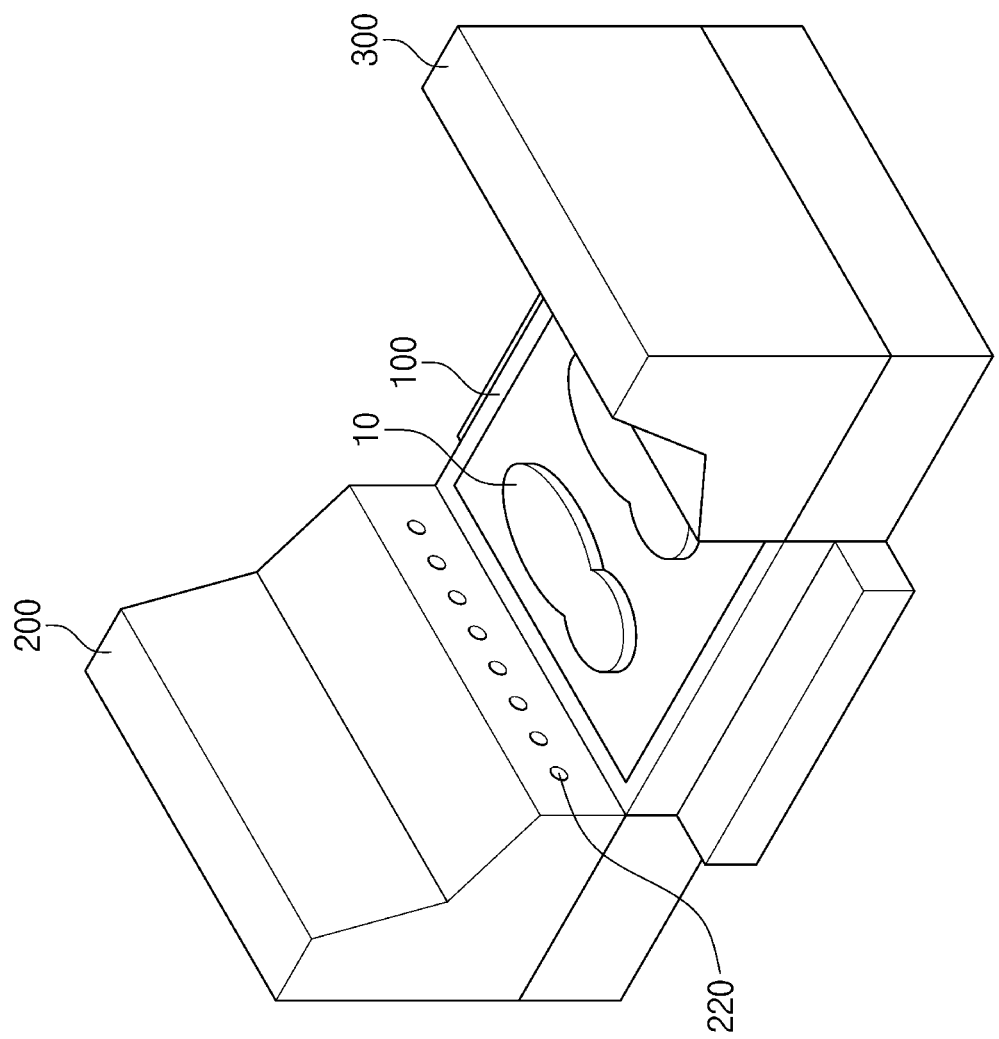
FIG. 1 is a perspective view showing a shoe inspection apparatus according to an embodiment of the inventive concept.

In order to fully understand the configuration and effects of the inventive concept, preferred embodiments of the inventive concept will be described in detail with reference to the accompanying drawings.

The inventive concept is not limited to the embodiments disclosed below, but may be implemented in various forms, and various modifications and changes may be added. However, it is provided to completely disclose the technical idea of the inventive concept through the description of the present embodiments, and to fully inform a person of ordinary skill in the art to which the inventive concept belongs. In the accompanying drawings, the components are shown to be enlarged in size for convenience of description, and the ratio of each component may be exaggerated or reduced.

The terms used in this specification are for describing embodiments and are not intended to limit the inventive concept. In addition, terms used in the present specification may be interpreted as meanings commonly known to those of ordinary skill in the art, unless otherwise defined.

In this specification, the singular form also includes the plural form unless specifically stated in the phrase. As used in the specification, in relation to 'comprises' and/or 'comprising', the mentioned elements, steps, operations and/or elements do not exclude the presence or addition of one or more other elements, steps, operations and/or elements.

In the case where a layer is referred to herein as being 'on' another layer, it may be formed directly on the upper surface of the other layer or a third layer may be disposed therebetween.

In the present specification, terms such as first and second are used to describe various regions, layers, and the like, but these regions and layers should not be limited by these terms. These terms are only used to distinguish one region or layer from another region or layer. Accordingly, a portion referred to as a first portion in one embodiment may be referred to as a second portion in another embodiment. The embodiments described and illustrated herein also include complementary embodiments thereof. Like reference numerals refer to like elements throughout the specification.

Hereinafter, embodiments of an apparatus for inspecting shoes and a method for inspecting shoes according to the inventive concept will be described in detail with reference to FIGS. 1 to 12.

Figure 2:
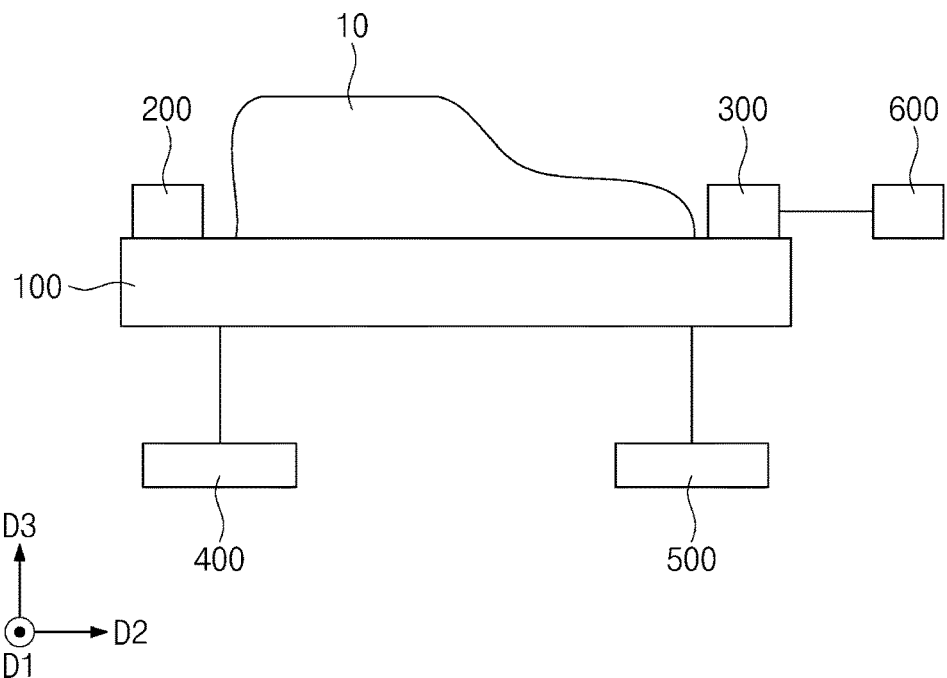
FIG. 2 is a cross-sectional view showing a shoe inspection apparatus according to an embodiment of the inventive concept.
Figure 3:
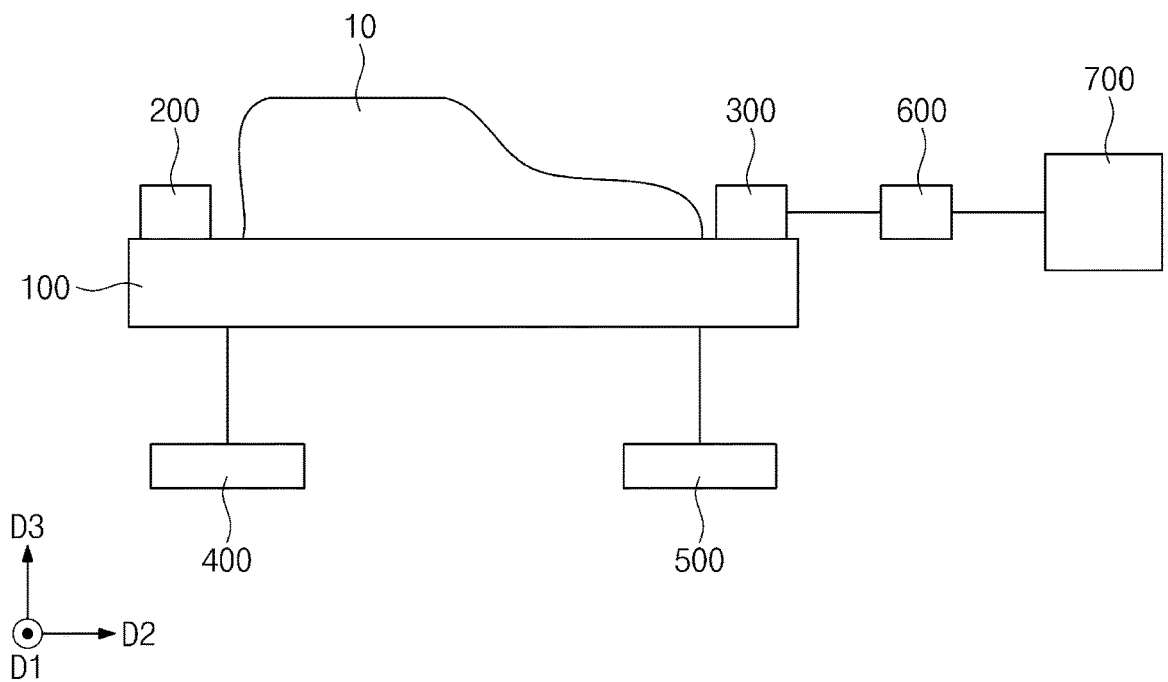
FIG. 3 is a cross-sectional view showing a shoe inspection apparatus further including a display unit in the embodiment of FIG. 2.

FIG. 1 is a perspective view showing a shoe inspection apparatus according to an embodiment of the inventive concept, and FIG. 2 is a cross-sectional view showing a shoe inspection apparatus according to an embodiment of the inventive concept. FIG. 3 is a cross-sectional view showing a shoe inspection apparatus further including a display unit in the embodiment of FIG. 2.

Referring to FIG. 1, a shoe inspection apparatus according to an embodiment of the inventive concept may include an inspection unit 100, an injection unit 200 including outlets 220, and a suction unit 300. The inspection subject 10 of the shoe inspection apparatus may be the shoes worn by the customer. A customer undergoing inspection may climb into the inspection unit 100 while wearing shoes. Inspection is carried out in the raised state. Fluid is injected from the outlet 220 of the injection unit 200 in order to separate the material in the bottom part of the inspection subject 10. As the fluid is sprayed during the inspection, the accuracy of the inspection may be increased.

Referring to FIG. 2, a shoe inspection apparatus according to an embodiment of the inventive concept may include an inspection unit 100, an injection unit 200, a suction unit 300, a transmission unit 400, a reception unit 500, and an analysis unit 600.

The inspection unit 100 may receive an inspection subject 10. The inspection subject 10 may be the shoes worn by the customer. The inspection subject may be an object such as a portable bag other than shoes. The inspection unit 100 may have a size that may accommodate at least one or more shoes. The upper surface of the inspection unit 100 may have a flat plate shape, and the plate shape may have a polygonal shape such as a square or a circle. The upper surface of the inspection unit 100 may include a window having a dielectric property. The window may have a structure that may support a customer wearing shoes during the inspection process.

The injection unit 200 may inject a fluid toward the inspection subject 10. The fluid may be a gas. The fluid may also be compressed air. The sprayed fluid may separate substances attached to the bottom part of the inspection subject 10. In addition, the sprayed fluid may remove moisture remaining on the bottom part of the inspection subject 10. The fluid may be injected through the outlet 220 (see FIG. 1) of the injection unit 200. The fluid may be injected in a direction parallel to the upper surface of the inspection unit 100. The fluid may be sprayed toward the bottom part of the inspection subject 10. As the fluid is sprayed in a direction parallel to the upper surface of the inspection unit 100, foreign substances or moisture may be efficiently removed from the inspection subject 10.

The suction unit 300 may suction the material separated from the inspection subject 10 and the fluid injected by the injection unit 200. Materials may be suctioned through the suction port of the suction unit 300. The suction port may have a tubular shape. A turbine may be connected to the suction unit 300 to prevent a reverse flow of the suctioned material or fluid. According to another embodiment of the inventive concept, the suction unit 300 may include a concentration part to concentrate the suctioned material or fluid. The concentration part may be positioned between the suction unit 300 and the analysis unit 600. Also, the concentration part may be connected to or located adjacent to the suction part.

The transmission unit 400 may emit electromagnetic waves toward the inspection subject 10. The electromagnetic wave may pass through the inspection unit 100 and reach the inspection subject 10. Electromagnetic waves may be reflected when there is a hidden material inside the inspection subject 10. The reflected electromagnetic wave may also pass through the inspection unit 100.

The electromagnetic wave emitted by the transmission unit 400 may be a millimeter wave, a terahertz wave, or a combination thereof. A millimeter wave is an electromagnetic wave with a wavelength in the range of 1 mm to 10 mm and a frequency in the range of 10 GHz to 300 GHz. A millimeter wave having a frequency in the range of 10 GHz to 100 GHz may penetrate dielectric materials such as plastics and ceramics, so it may be effective for security inspection. A terahertz wave is an electromagnetic wave having a wavelength in the range of 0.03 mm to 3 mm, and a frequency in the range of 0.1 THz to 10 THz. Terahertz waves are highly transparent to non-conductive materials and highly reflective to conductive materials such as metals. Since terahertz wave belongs to electromagnetic wave with low photon energy, it may be effective for security inspection such as hidden substances.

The reception unit 500 may receive the electromagnetic wave reflected from the inspection subject 10. The received electromagnetic wave signal may be transmitted to the analysis unit 600. The reception unit 500 may include an antenna for efficient reception of the reflected electromagnetic wave. The antenna may be a circularly polarized Archimedean spiral antenna.

The analysis unit 600 may analyze the material, the fluid, and the electromagnetic wave signal received by the reception unit 500 suctioned into the suction unit 300. The analysis unit 600 may include an Ion Mobility Spectrometer (IMS) to detect an explosive component. The IMS may ionize the suctioned material and then move the suctioned material. Then, the IMS may analyze the component by detecting the mobility of the ion.

Referring to FIG. 3, a shoe inspection apparatus according to an embodiment of the inventive concept may include an inspection unit 100, an injection unit 200, a suction unit 300, a transmission unit 400, a reception unit 500, an analysis unit 600, and a display unit 700.

The display unit 700 may display whether there is a hidden substance or a dangerous substance based on the analysis result by the analysis unit 600. The display unit 700 may include a monitoring system that displays analysis results in real time. In the case of hazardous substances such as explosives, the presence or absence may be displayed on the screen of the display unit according to the analysis result of the IMS. In the case of the hidden material, the signal received by the reception unit 500 may be imaged and displayed as an image on the screen.

Figure 4:
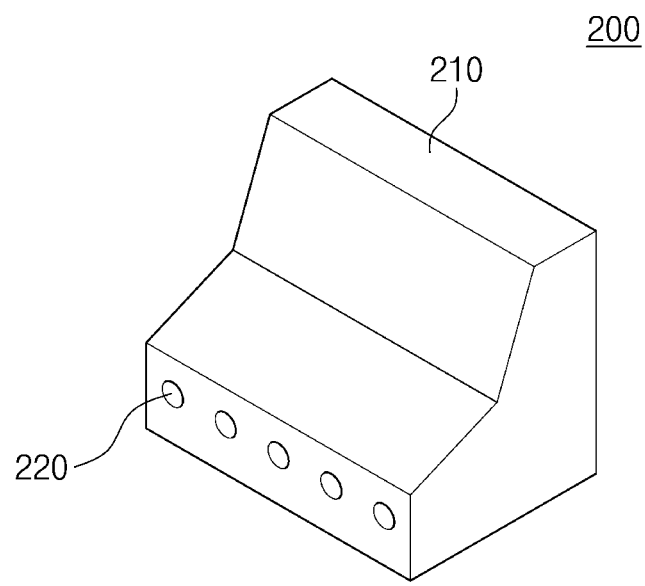
FIG. 4 is a perspective view showing an injection unit of the shoe inspection apparatus of FIG. 1.
Figure 5:
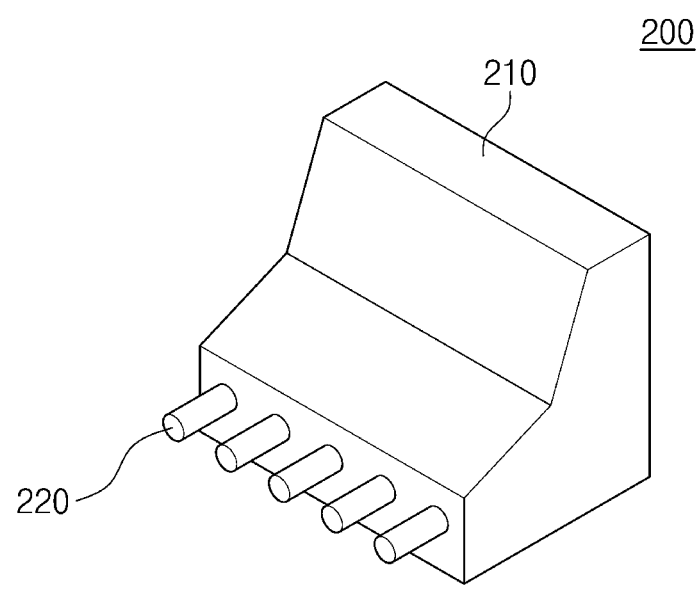
FIG. 5 is a perspective view showing an injection unit of a shoe inspection apparatus according to an embodiment of the inventive concept.

FIG. 4 is a perspective view showing the injection unit of the shoe inspection apparatus of FIG. 1, and FIG. 5 is a perspective view showing the injection unit of the shoe inspection apparatus according to the embodiment of the inventive concept.

Referring to FIG. 4, the injection unit 200 of the shoe inspection apparatus according to the embodiment of the inventive concept may include a support part 210 and at least one outlet 220. The support part 210 may support the outlet 220. The support part 210 is not limited to the shape shown in FIG. 4, and may have other shapes capable of supporting the outlet 220.

The outlet 220 may inject a fluid toward the inspection subject. The exit of the outlet 220 may have a cylindrical hole shape. According to the embodiment of FIG. 4, the body of the outlet 220 may be inserted into the support part 210.

Referring to FIG. 5, the injection unit 200 may include a support part 210 and at least one outlet 220. The support part 210 may support the outlet 220. The outlet 220 may have a tube shape, and the exit of the outlet 220 may have a cylindrical hole shape. According to the embodiment of FIG. 5, the body of the outlet 220 may protrude from the support part 210.

Figure 6A:
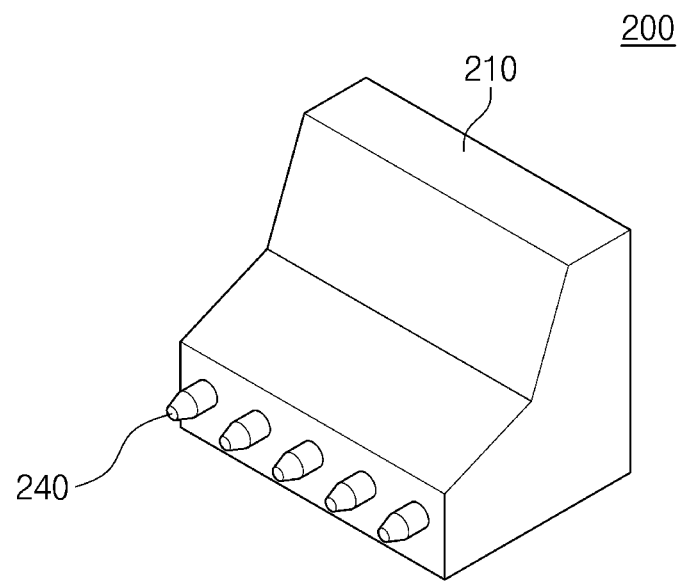
FIG. 6A is a perspective view showing the structure of the air nozzle of the injection unit of the shoe inspection apparatus according to the embodiment of the inventive concept.
Figure 6B:
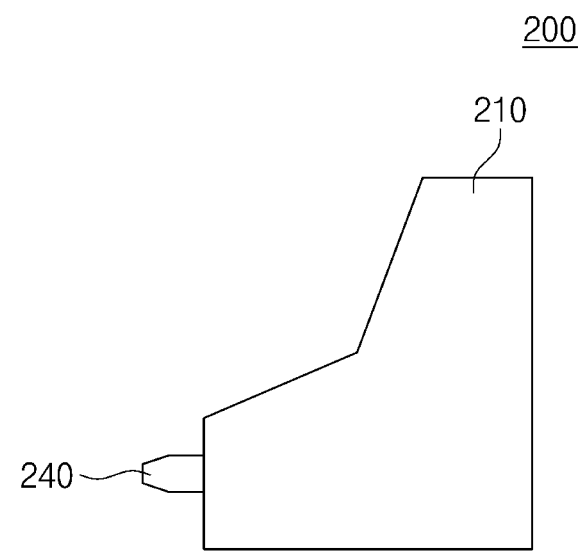
FIG. 6B is a cross-sectional view showing the injection unit according to the embodiment of FIG. 6A.

FIG. 6A is a perspective view showing the structure of an air nozzle among the injection units of the shoe inspection apparatus according to the embodiment of the inventive concept, and FIG. 6B is a cross-sectional view showing the injection unit according to the embodiment of FIG. 6A.

Referring to FIGS. 6A and 6B, the injection unit 200 of the shoe inspection apparatus according to another embodiment of the inventive concept may include a support part 210 and at least one air nozzle 240. The support part 210 may support the air nozzle 240. The support part 210 is not limited to the shape shown in FIG. 4, and may have other shapes capable of supporting the air nozzle 240.

The air nozzle 240 may inject a fluid towards the inspection subject. The fluid may be compressed air. Compressed air may be provided through a pump connected to the support part 210. The air nozzle 240 may include a tubular flow path. The diameter of the flow path of the air nozzle 240 may decrease toward the exit through which the fluid is discharged. The exit of the air nozzle 240 may have a cylindrical hole shape. According to the embodiment of FIGS. 6A and 6B, the air nozzle 240 may be supported while in contact with the support part 210.

FIGS. 7A to 7F are plan views showing various embodiments according to the positions of the injection unit and the suction unit of the shoe inspection apparatus.

Figure 7A:
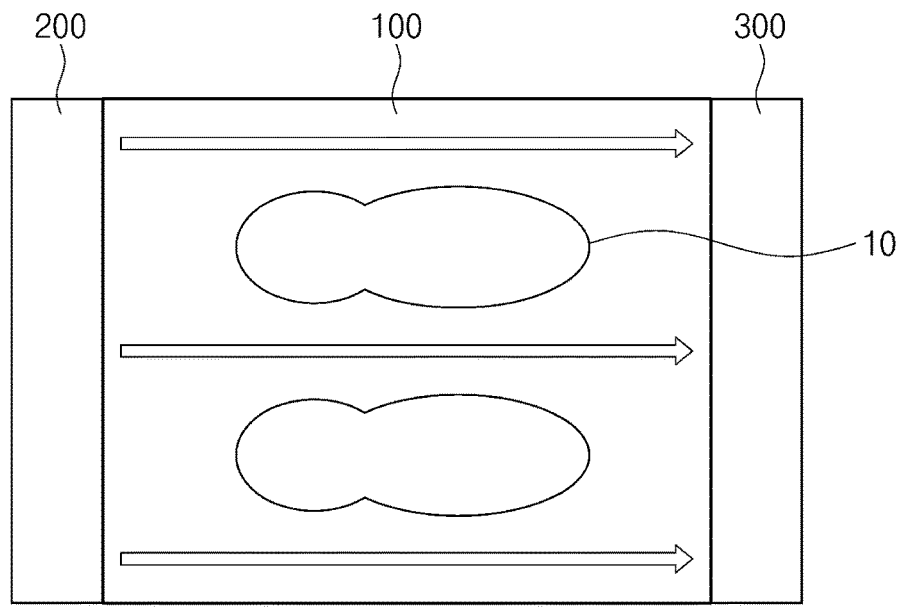
FIGS. 7A to 7F are plan views showing various embodiments according to the location of the injection unit/suction unit of the shoe inspection apparatus.

Referring to FIG. 7A, the injection unit 200 may be positioned adjacent to the inspection unit 100 in the rear direction of the inspection subject 10. The suction unit 300 may be positioned to face the injection unit 200 with the inspection unit 100 disposed therebetween. That is, the suction unit 300 may be positioned in the front direction of the inspection subject 10. The fluid injected from the injection unit 200 may flow in a direction from the rear side of the inspection subject 10 to the front side.

Figure 7B:
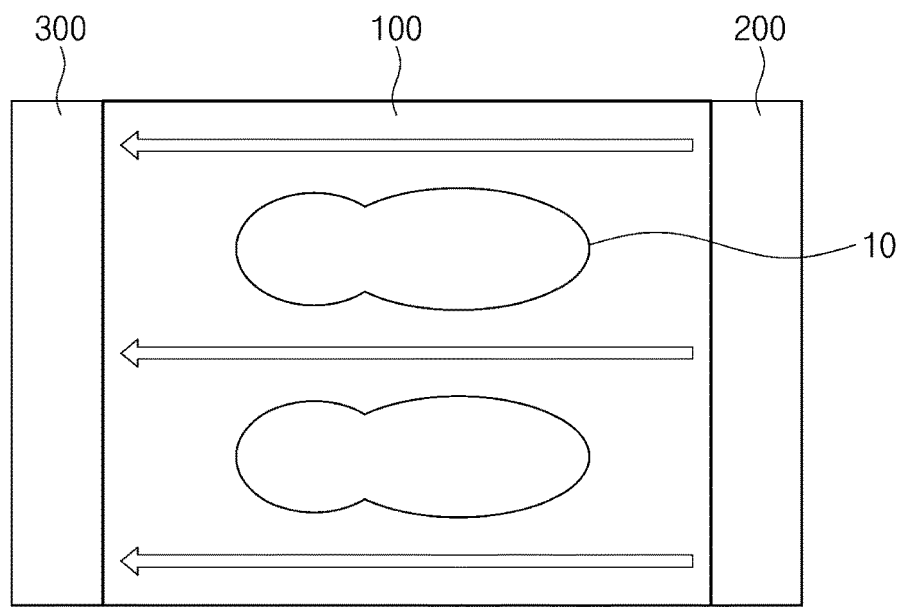

Referring to FIG. 7B, the injection unit 200 may be positioned adjacent to the inspection unit 100 in the front direction of the inspection subject 10. The suction unit 300 may be positioned to face the injection unit 200 with the inspection unit 100 disposed therebetween. That is, the suction unit 300 may be located in the rear direction of the inspection subject 10. The fluid injected from the injection unit 200 may flow in a direction from the front to the rear of the inspection subject 10.

Figure 7C:
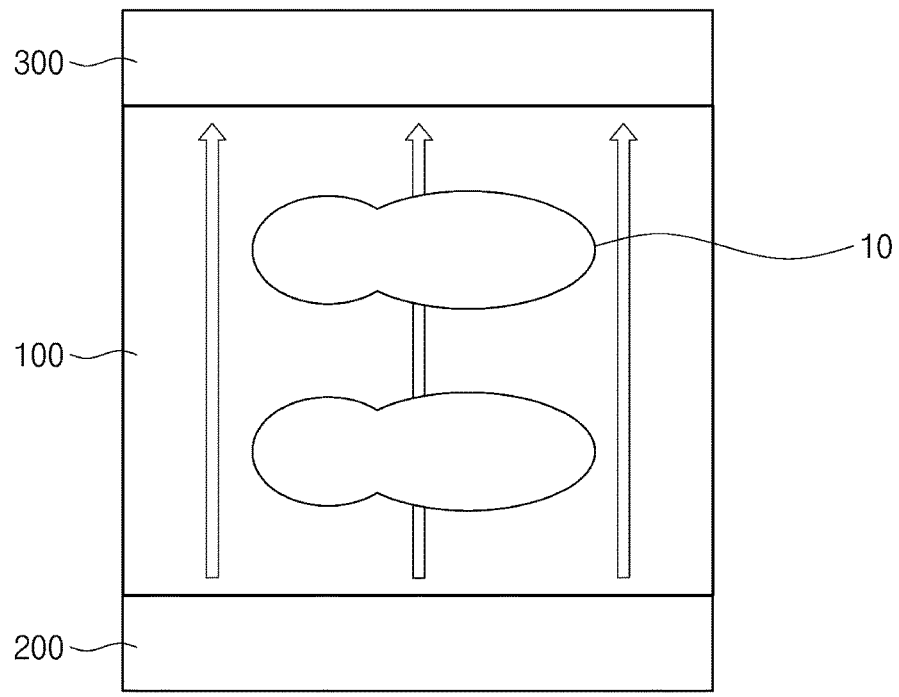
Figure 7D:
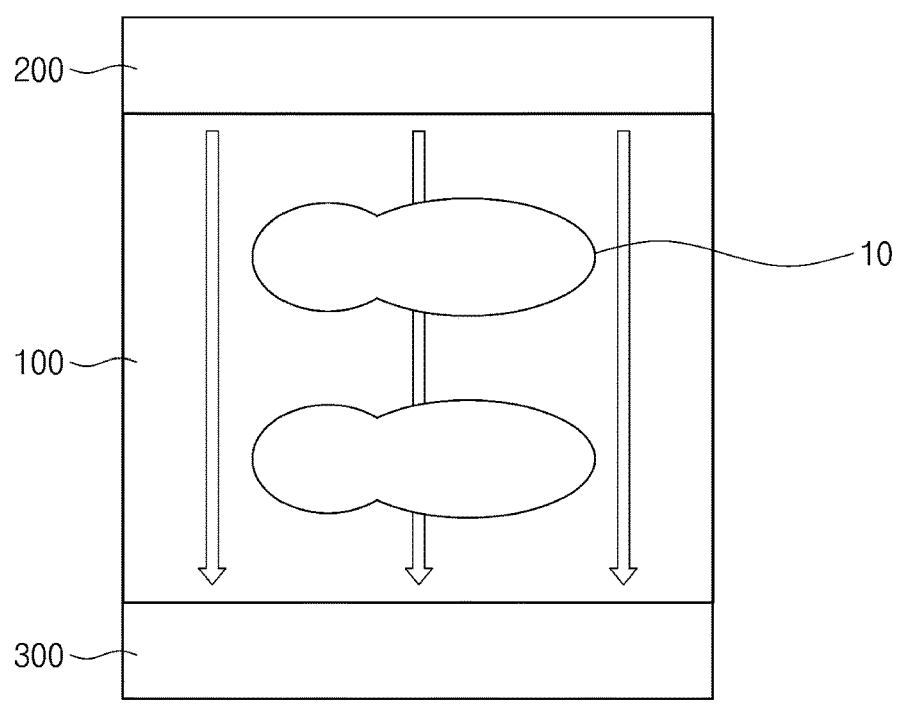

Referring to FIGS. 7C and 7D, the injection unit 200 may be positioned adjacent to the inspection unit 100 in a lateral direction of the inspection subject 10. The lateral direction means left or right with respect to the inspection subject 10. The suction unit 300 may be positioned to face the injection unit 200 with the inspection unit 100 disposed therebetween. That is, the suction unit 300 may be positioned in the lateral direction of the inspection subject 10, and may be positioned on the opposite side to the injection unit 200. The fluid injected from the injection unit 200 may flow in a direction from the side of the inspection subject 10 to the opposite side.

Figure 7E:
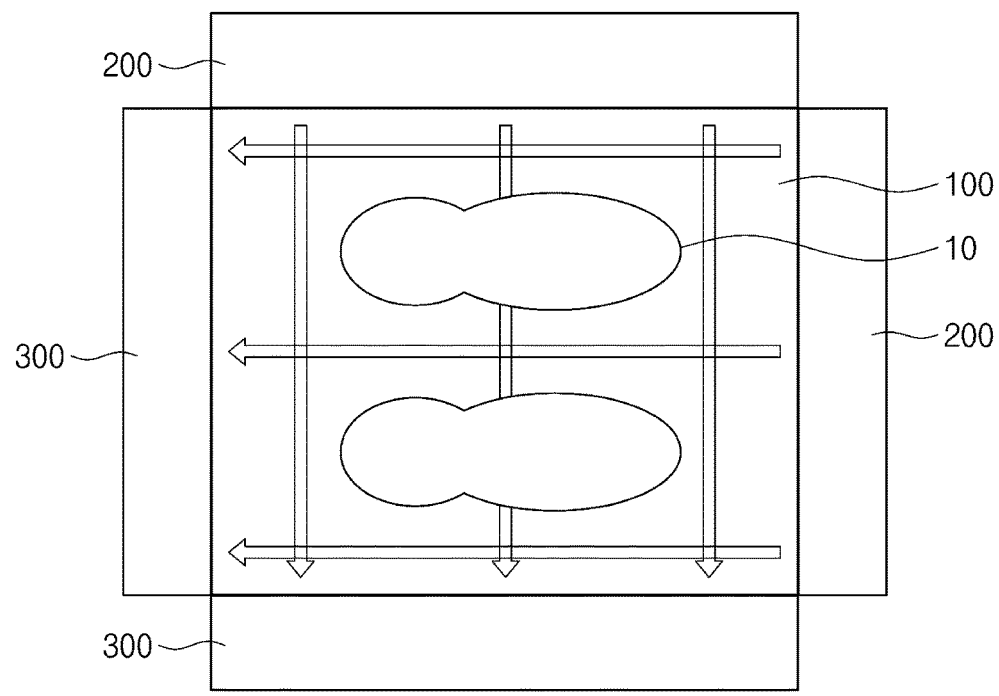
Figure 7F:
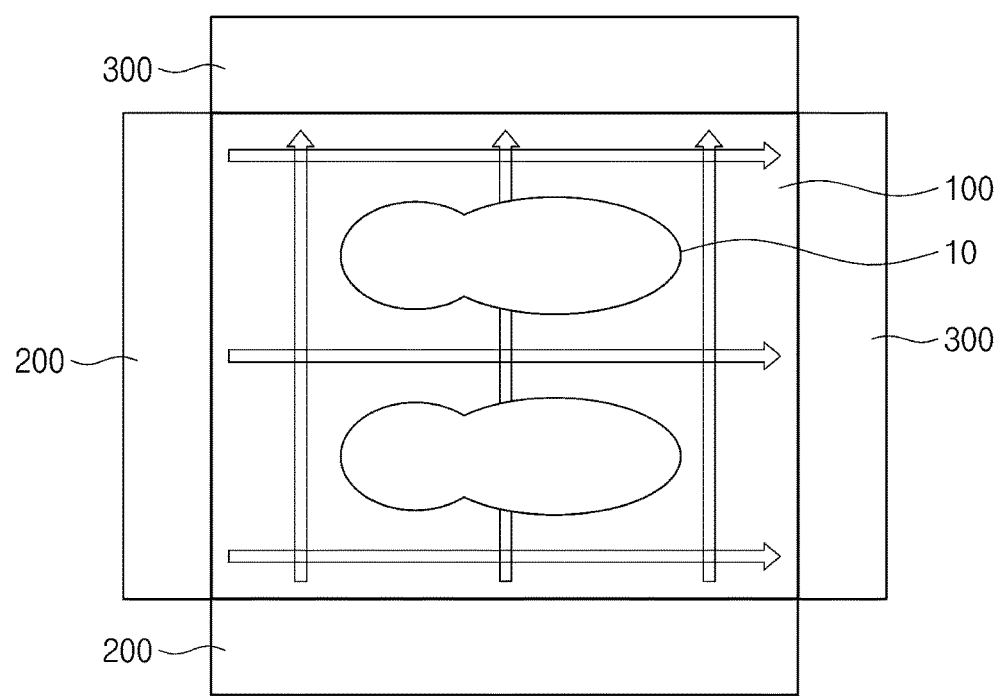

Referring to FIGS. 7E and 7F, the location of the injection unit 200 may be determined by a combination of two or more of the front, rear, and side surfaces of the inspection subject 10. That is, the injection unit 200 is positioned adjacent to the inspection unit 100, and may be positioned on the front and side surfaces of the inspection subject 10 or positioned on the rear and side surfaces of the inspection subject 10. The suction unit 300 may be positioned to face the injection unit 200 with the inspection unit 100 disposed therebetween. When the injection unit 200 is located on the front and side of the inspection subject 10, the fluid injected from the injection unit 200 may flow in a direction from the front to the rear of the inspection subject 10 and from the side to the opposite side.

Figure 8:
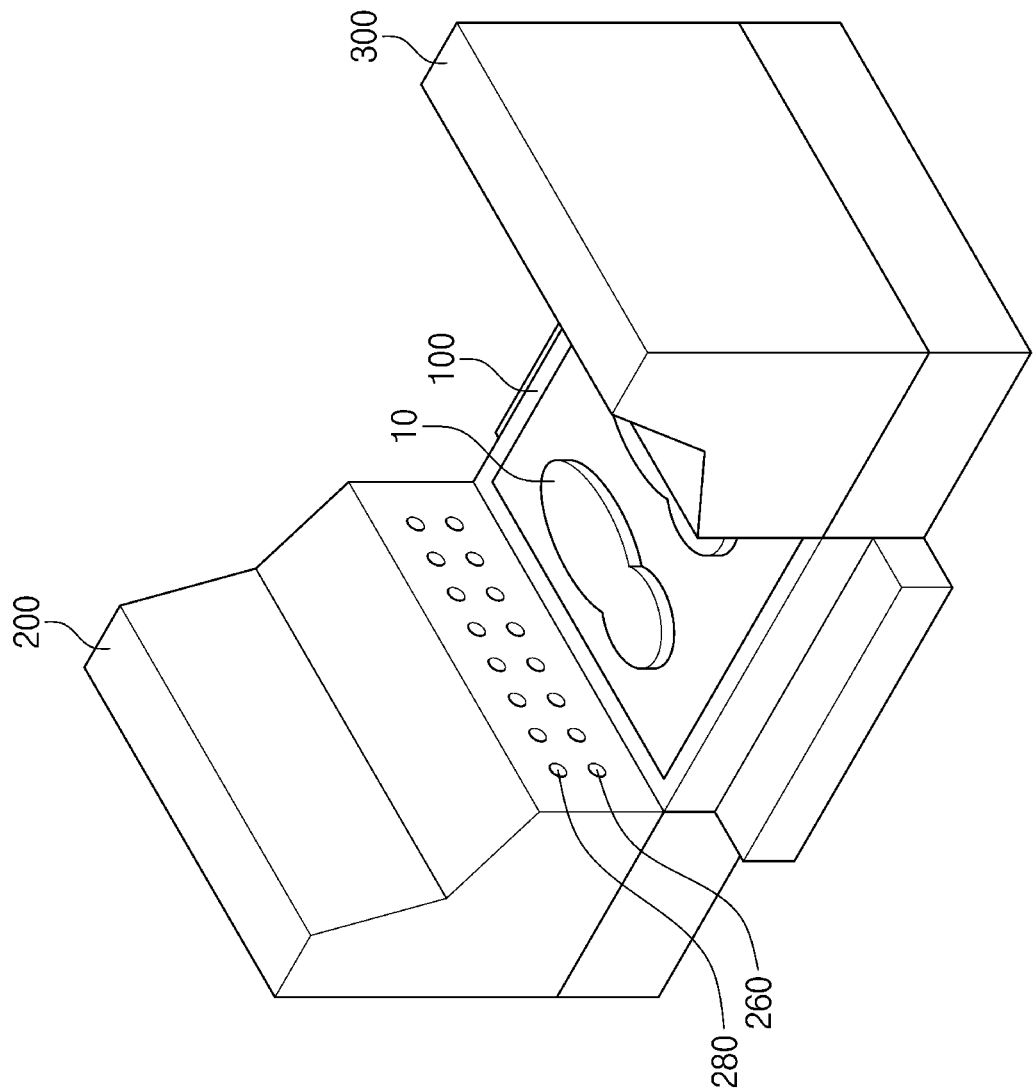
FIG. 8 is a perspective view showing a structure in which the first outlet and the second outlet of the injection unit are vertically overlapped.

FIG. 8 is a perspective view showing a structure in which the first outlet and the second outlet of the injection unit are vertically overlapped as another embodiment of the inventive concept.

Referring to FIG. 8, outlets 260 and 280 of the injection unit 200 of the shoe inspection apparatus may have an overlapping structure. The first outlet 260 and the second outlet 280 may be spaced apart from each other and vertically overlapped. The first outlet 260 and the second outlet 280 may inject a fluid toward the inspection subject 10. The exits of the first outlet 260 and the second outlet 280 may have a cylindrical hole shape. According to the embodiment of FIG. 8, the body of the first outlet 260 and the second outlet 280 may be inserted into the support part of the injection unit 200. As the first outlet 260 and the second outlet 280 vertically overlap, the amount of fluid sprayed to one point may increase. Accordingly, the material or moisture attached to the bottom part of the inspection subject 10 may be more effectively removed.

Figure 9:
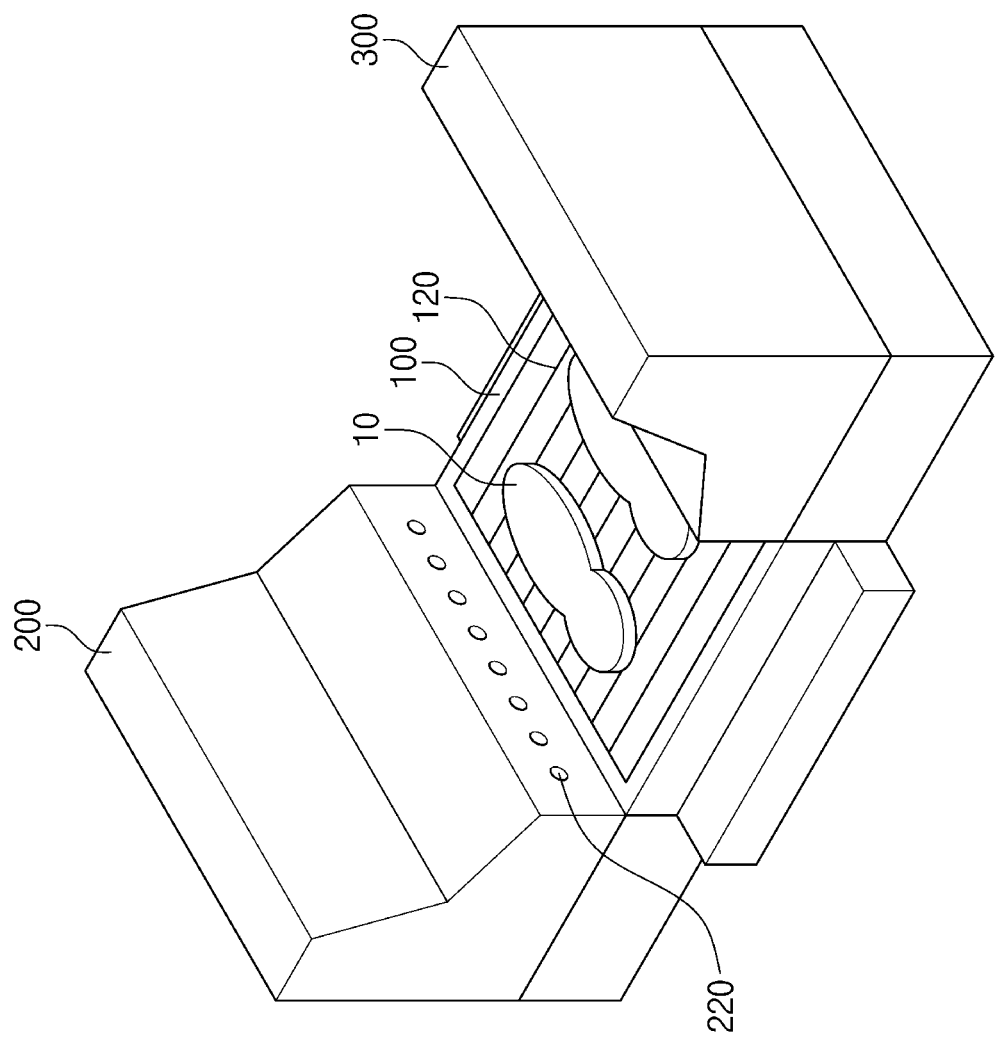
FIG. 9 is a perspective view showing a shoe inspection apparatus according to another embodiment of the inventive concept.

FIG. 9 is a perspective view showing a shoe inspection apparatus according to another embodiment of the inventive concept.

Referring to FIG. 9, the shoe inspection apparatus according to the embodiment of FIG. 1 may include microfluidic channels 120 on the upper surface of the inspection unit 100. The microfluidic channels 120 may be formed through patterning. The fluid may be injected into the injection port of the microfluidic channel 120 close to the injection unit 200. The injected fluid may flow out to the exit port of the microfluidic channel 120 close to the suction unit 300. The fluid passing through the microfluidic channels 120 may be a liquid or a gas. The fluid may be compressed air. Compressed air may be provided through a pump connected to the injection unit 200.

According to another embodiment of the inventive concept, the microfluidic channels 120 may be formed only in contacting portions based on the area in which the inspection subject 10 is in contact with the upper surface of the inspection unit 100. A portion where the inspection subject 10 does not contact the upper surface of the inspection unit 100 may have a flat plate shape. Accordingly, noise or vibration caused by compressed air may be minimized, and the precision of detection of hidden substances or dangerous substances may be increased.

Figure 10:
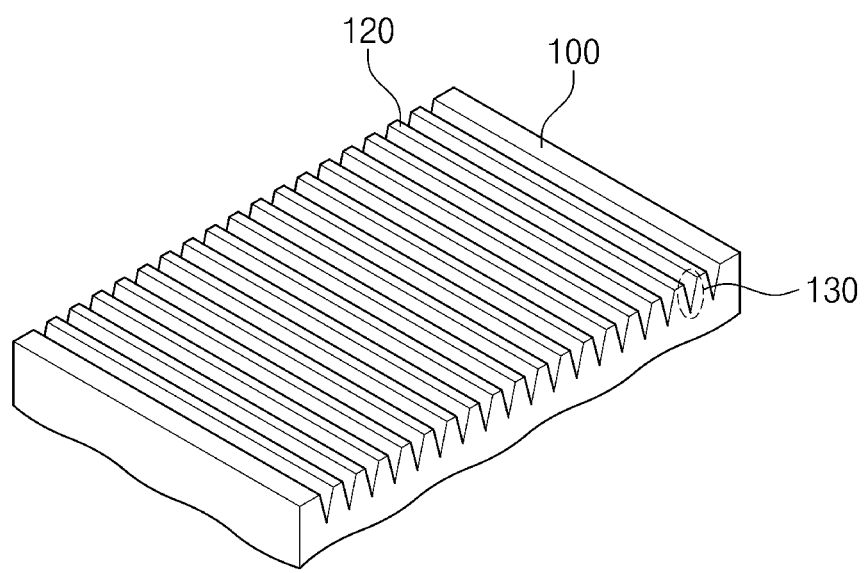
FIG. 10 is a perspective view showing a structure in which microfluidic channels include trenches.

FIG. 10 is a perspective view showing a structure in which microfluidic channels include trenches as an embodiment of the inventive concept.

Referring to FIG. 10, the microfluidic channels 120 may include trenches 130 defined on the upper surface of the inspection unit 100, respectively. The trench 130 may be defined as a structure in which both side surfaces are disposed to face each other, and the distance between the side surfaces increases toward the upper surface of the inspection unit 100. Due to the trench 130, it is possible to induce a pressure difference between a portion close to the upper surface of the inspection unit 100 and a portion farther away. A portion close to the upper surface of the inspection unit 100 may be a portion in contact with the inspection subject. The pressure of a portion close to the upper surface of the inspection unit 100 may be high, and the pressure of a portion farther from the upper surface of the inspection unit 100 may be low. Depending on the pressure difference, fluid, moisture, and substances separated from the inspection subject may escape from the upper surface of the inspection unit 100 in a direction that is deeper.

Figure 11:
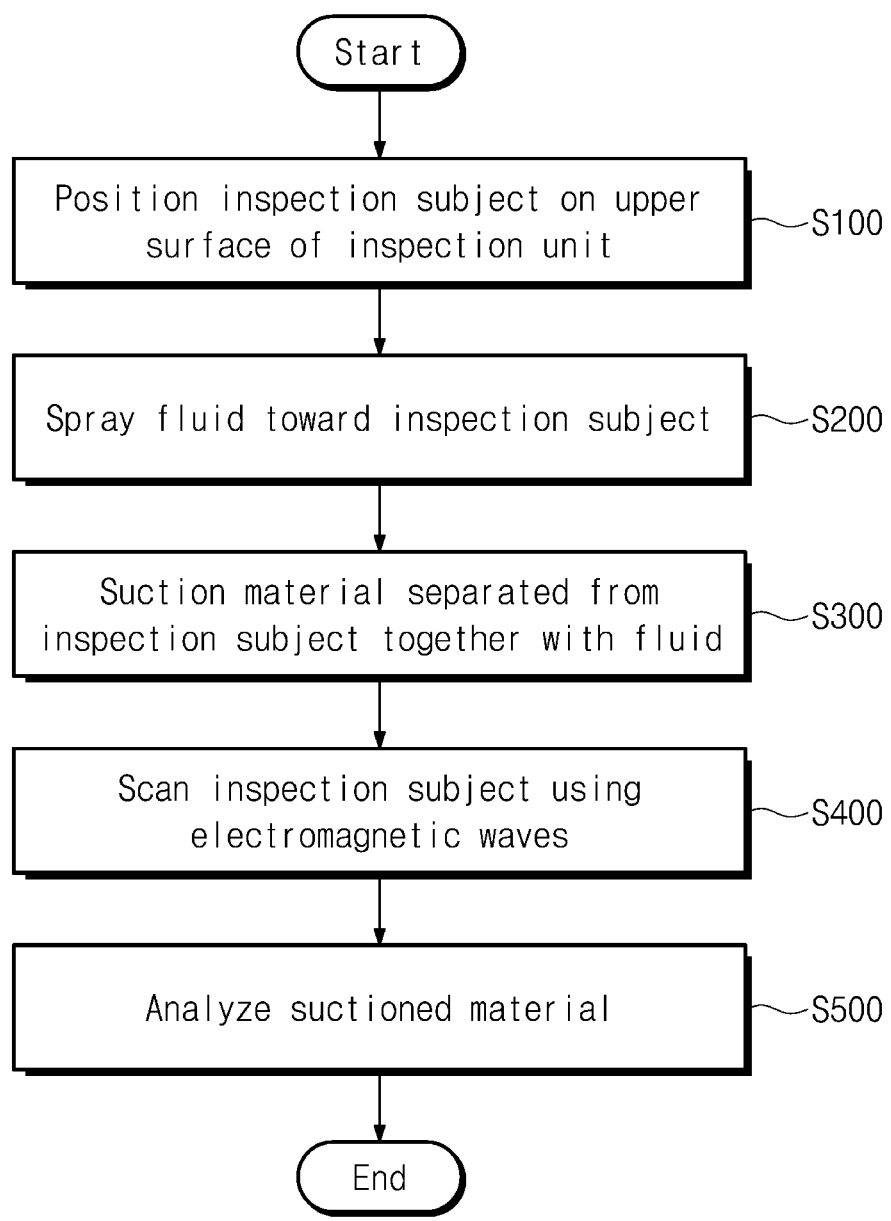
FIGS. 11 to 12 are flowcharts showing a method for inspecting shoes of the inventive concept.
Figure 12:
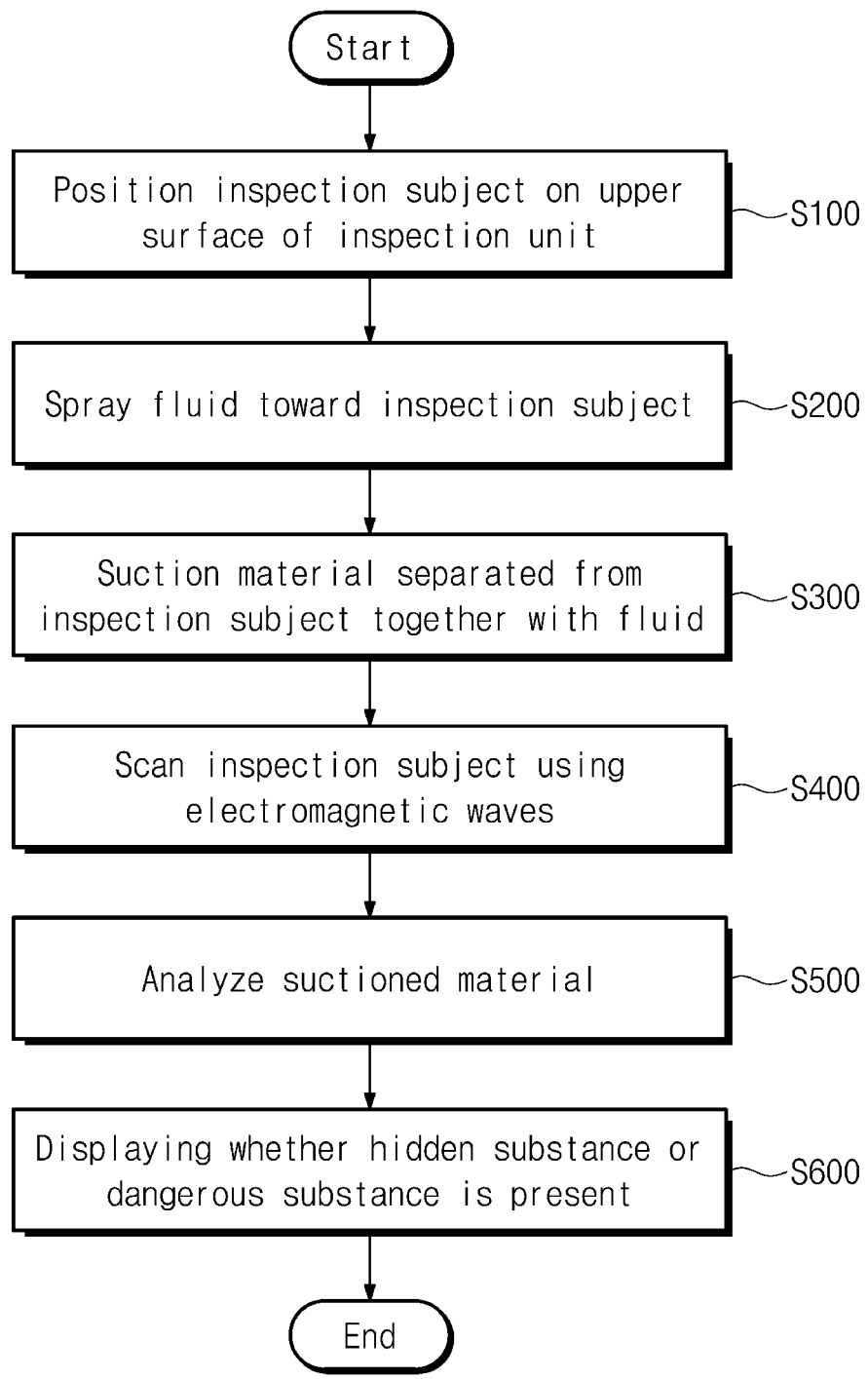

FIGS. 11 to 12 are flowcharts showing a method for inspecting shoes of the inventive concept.

Referring to FIG. 11, the method for inspecting shoes according to an embodiment of the inventive concept includes positioning the inspection subject on the upper surface of the inspection unit in operation S100, scanning the inspection subject on the inspection unit using electromagnetic waves in operation S200, spraying the fluid towards the inspection subject on the inspection unit in operation S300, suctioning the material separated from the inspection subject together with the fluid in operation S400, and analyzing the suctioned material in operation S500.

The positioning of the inspection subject on the upper surface of the inspection unit in operation S100 is an operation in which a person wearing shoes, which is the inspection subject, is placed on the upper surface of the inspection unit. When the wearer is placed on the upper surface of the inspection unit, the upper surface of the inspection stand and the bottom part of the inspection subject may come into contact with each other so as not to be separated from each other.

The injecting of the fluid toward the inspection subject on the inspection unit in operation S200 is an operation of injecting the fluid from the injection unit toward the inspection subject. The fluid may be compressed air. Spraying fluid before scanning the inside of the inspection subject may be to remove substances or moisture adhering to the bottom part of the inspection subject. This may increase the accuracy of the method for inspecting shoes.

The suctioning of the material and the fluid separated from the inspection subject in operation S300 is an operation in which the suction unit suctions the material and fluid separated from the bottom part of the inspection subject due to the injected fluid. When the concentration part is included in the suction unit according to the embodiment of the inventive concept, the separated material and fluid may be concentrated after suction. Due to this, the reverse flow of the separated material and fluid may be prevented, and the detection accuracy may be increased.

The scanning of the inspection subject using the electromagnetic waves in operation S400 is an operation of scanning the inside of the inspection subject with electromagnetic waves emitted from the transmission unit. The emitted electromagnetic waves may be millimeter waves or terahertz waves. As scanning after the spraying of the fluid toward the inspection subject on the inspection unit in operation S200 and the suctioning of the material and fluid separated from the inspection subject in operation S300, the method may be performed in the absence of substances or moisture adhering to the bottom part of the inspection subject. It is possible to prevent scattering of electromagnetic waves reflected by the material inside the inspection subject.

The analyzing of the suctioned material in operation S500 is an operation in which the analysis unit analyzes the material suctioned through the section unit and the signal of electromagnetic wave reflected through the reception unit. Analysis of suctioned material may be done through the IMS. Through this, it is possible to detect hazardous substances such as explosives. The reflected electromagnetic wave signal may be processed through the analysis of millimeter wave or terahertz wave. Through this, it is possible to detect hidden substances.

Referring to FIG. 12, the method for inspecting shoes according to the embodiment of FIG. 11 may include displaying whether a hidden substance or a dangerous substance is present in operation S600. The displaying of the presence of the hidden substance or the dangerous substance in operation S600 is an operation of displaying the presence or absence of a dangerous substance or a hidden substance on the inspection subject through the analysis of the suctioned substance and the reflected electromagnetic wave through the display unit. In the case of a hidden substance, it may be detected by converting the reflected electromagnetic wave into an image data signal and showing a picture (image) of the inside of the inspection subject on the display unit. In the case of hazardous substances, it may be detected by comparing the components of the sample from the inspection subject with existing data through the IMS.

According to the concept of the inventive concept, it is possible to provide an apparatus for inspecting shoes and a method for inspecting shoes in which the inspection efficiency of hidden substances or dangerous substances is improved and the convenience of customers undergoing inspection is improved. By using electromagnetic waves (millimeter wave/terahertz wave) that may penetrate and scan the inside of the shoe, the customer receives the inspection without taking off the shoe such that the inspection time is shortened and the inconvenience that customers may feel may be eliminated. In addition, according to the concept of the inventive concept, the accuracy of detection of hidden substances or dangerous substances may be improved because foreign substances or moisture that may exist on the bottom part of the shoes to be inspected are removed and inspection is performed at the same time.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

What is claimed is:

1. A shoe inspection apparatus for detecting hidden or dangerous substances, the shoe inspection apparatus comprising:
   an inspection unit configured to accommodate an inspection subject;
   a transmission unit configured to emit electromagnetic waves toward the inspection subject accommodated in the inspection unit;
   a reception unit configured to receive the electromagnetic wave reflected from the inspection subject;
   an injection unit configured to inject a fluid toward a bottom part of the inspection subject accommodated in the inspection unit;
   a suction unit configured to suction a material separated from the bottom part of the inspection subject together with the fluid; and
   an analysis unit configured to analyze a component of the material introduced into the suction unit and the electromagnetic wave received by the reception unit,
   wherein the injection unit comprises a first injection unit and a second injection unit,
   wherein the suction unit comprises a first suction unit and a second suction unit,
   wherein the first injection unit and the first suction unit spaced apart in a first direction,
   wherein the second injection unit and the second suction unit spaced apart in a second direction that is intersecting with the first direction,
   wherein the inspection unit disposed between the first injection unit and the first suction unit, and disposed between the second injection unit and the second suction unit,
   wherein microfluidic channels are provided on an upper surface of the inspection unit,
   wherein the microfluidic channels comprise trenches defined on the upper surface of the inspection unit respectively, and
   wherein the trenches extend in the first direction.

2. The shoe inspection apparatus of claim 1, further comprising a display unit for displaying a result analyzed in the analysis unit.

3. The shoe inspection apparatus of claim 1, wherein the inspection unit comprises an inspection stand configured to receive at least one shoe as the inspection subject,
   wherein an upper surface of the inspection stand has a flat plate shape.

4. The shoe inspection apparatus of claim 1, wherein the electromagnetic wave comprises millimeter wave or terahertz wave.

5. The shoe inspection apparatus of claim 1, wherein the fluid injected from the injection unit comprises compressed air.

6. The shoe inspection apparatus of claim 1, wherein the injection unit is configured to inject the fluid in a direction parallel to the upper surface of the inspection unit.

7. The shoe inspection apparatus of claim 1, wherein the injection unit is adjacent to at least one of front, rear and side surfaces of the inspection subject.

8. The shoe inspection apparatus of claim 1, wherein the injection unit comprises a first outlet and a second outlet vertically overlapping with the first outlet.

9. The shoe inspection apparatus of claim 1, wherein the injection unit comprises at least one air nozzle.

10. The shoe inspection apparatus of claim 9, wherein the air nozzle comprises a tubular flow path,
    wherein a diameter of the flow path decreases toward an exit through which the fluid is discharged.

11. The shoe inspection apparatus of claim 1, wherein the suction unit further comprises a concentration part for concentrating the fluid.

12. The shoe inspection apparatus of claim 1, wherein the analysis unit, comprises an ion mobility spectrometer.

13. The shoe inspection apparatus of claim 1, wherein the inspection unit comprises an inspection stand configured to receive at least one shoe as the inspection subject.

14. The shoe inspection apparatus of claim 13, wherein the microfluidic channels are provided based on an area in which the inspection subject contacts the upper surface of the inspection unit.

15. The shoe inspection apparatus of claim 13, wherein the microfluidic channels comprises trenches defined on the upper surface of the inspection unit, respectively.

16. A method for inspecting shoes for detecting hidden substances or hazardous substances, the method comprising:
    placing an inspection subject on an upper surface of an inspection unit;
    spraying a fluid from an injection unit toward the inspection subject on the inspection unit;
    suctioning a material separated from the inspection subject together with the fluid toward a suction unit;
    scanning the inspection subject on the inspection unit using electromagnetic waves; and
    analyzing the suctioned material through an IMS (Ion Mobility Spectrometer), wherein the injection unit comprises a first injection unit and a second injection unit, wherein the suction unit comprises a first suction unit and a second suction unit, wherein the first suction unit and the first injection unit spaced apart in a first direction, wherein the second suction unit and the second injection unit spaced apart in a second direction, wherein microfluidic channels are provided on an upper surface of the inspection unit, wherein the microfluidic channels comprise trenches defined on the upper surface of the inspection unit respectively, and wherein the trenches extend in the first direction.

17. The method of claim 16, wherein the scanning of the inspection subject comprises scanning an inside of the inspection subject using millimeter wave or terahertz wave.

18. The method of claim 16, wherein the analyzing of the suctioned material comprises analyzing the material through an ion mobility spectrometer.

19. The method of claim 16, further comprising displaying a presence of a hidden substance or a dangerous substance based on an analysis result of the material.

* * * * *